United States Patent [19]

Gillen

[11] Patent Number: 4,895,190

[45] Date of Patent: Jan. 23, 1990

[54] ACTUATOR AND HOSE ASSEMBLY FOR AEROSOL CONTAINERS

[75] Inventor: Donald P. Gillen, Neodesha, Kans. 66757

[73] Assignee: Airosol Company, Inc., Neodesha, Kans.

[21] Appl. No.: 373,632

[22] Filed: Jun. 29, 1989

Related U.S. Application Data

[63] Continuation of Ser. No. 158,863, Feb. 22, 1988, abandoned, which is a continuation of Ser. No. 23,449, Mar. 9, 1987, abandoned.

[51] Int. Cl.$^4$ .............................................. B65B 3/04
[52] U.S. Cl. ......................................... 141/1; 141/346; 141/382; 141/383; 141/392
[58] Field of Search ................................ 141/382–386, 141/38, 392, 346, 348, 349, 351, 353, 355

[56] References Cited

U.S. PATENT DOCUMENTS

| | | | |
|---|---|---|---|
| 3,763,902 | 10/1973 | Donahue | 14/349 |
| 3,976,110 | 8/1976 | White | 141/346 |
| 4,644,982 | 2/1987 | Hatch | 141/383 |
| 4,658,869 | 4/1987 | Soon-Fu | 141/98 |

FOREIGN PATENT DOCUMENTS

| | | | |
|---|---|---|---|
| 657578 | 2/1963 | Canada | 141/353 |
| 1389305 | 1/1965 | France | 141/353 |
| 1065176 | 4/1967 | United Kingdom | 141/386 |

OTHER PUBLICATIONS

Photos of "Fix a Flat" by Nationwide Industries.
Photos of "Air Supply" by Pennzoil Co., Gumout Division.

Primary Examiner—Ernest G. Cusick
Attorney, Agent, or Firm—Hovey, Williams, Timmons & Collins

[57] ABSTRACT

An actuator and hose assembly is provided which allows conveyance of pressurized fluid from a conventional aerosol container to a receiver and which allows precise delivery of only that portion of the container contents needed while allowing the balance of the fluid in the container to be saved for future use. The preferred actuator and hose assembly includes a fluid conveying hose having a conventional fitting at one end thereof for fluidically coupling one end of the hose with a receiver of the fluid, and an actuator sub-assembly coupled with the other end of the hose. The sub-assembly includes an actuator collar configured for friction coupling with the seam ring of the aerosol container, a selectively manually shiftable, upwardly biased, actuator element coupled coaxially within the collar and presenting a stem-engaging shoulder configured to abuttingly engage the end of the container stem in order to shift the stem downwardly, and an enclosed fluid departure channel defined in the actuator element for directing the fluid escaping through the stem into the other end of the hose with the shoulder providing a fluid seal between the stem and element.

10 Claims, 1 Drawing Sheet

U.S. Patent  Jan. 23, 1990  4,895,190
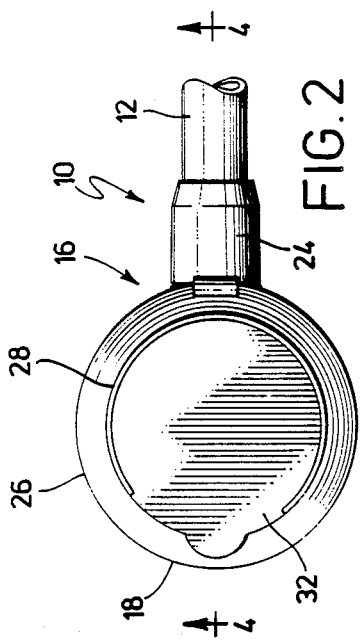
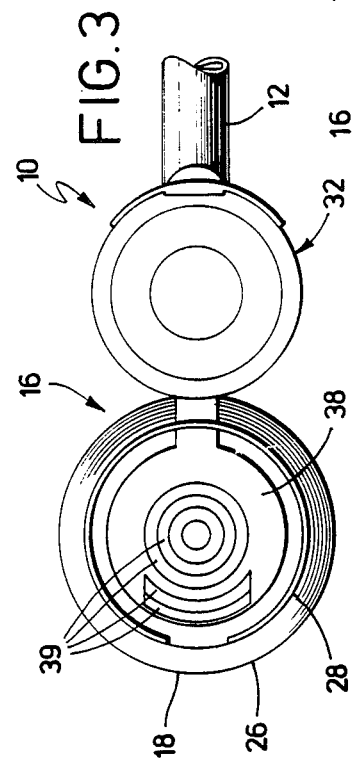
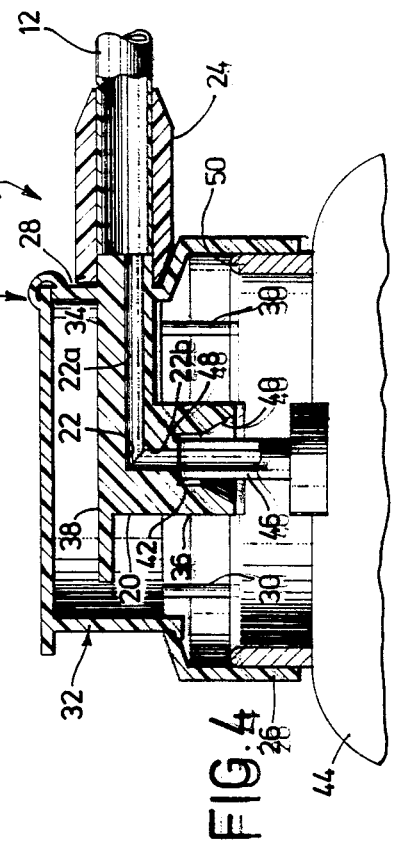

ACTUATOR AND HOSE ASSEMBLY FOR AEROSOL CONTAINERS

This application is a continuation of application Ser. No. 07/158,863, filed 2/22/88 which is a 1.60 continuations of 3/9/87, both abandoned.

BACKGROUND OF THE INVENTION

1. Field of the Invention

The present invention relates to an actuator and hose assembly for conveying pressurized fluid from an aerosol container to a receiver wherein the container has an upwardly biased and extending, axially shiftable, tubular stem to which the actuator couples for selectively releasing the fluid. More particularly, the actuator is biased upwardly and requires manual downward shifting in order to release the fluid from the container for conveyance through the hose to a receiver to which the other end of the hose assembly is coupled.

2. Description of the Prior Art

Prior art devices are available for conveying pressurized fluid from an aerosol container to a receiver, and more particularly, for example, for conveying pressurized refrigerant from a container thereof to the low side of an automotive air conditioner system. Such devices are used by "do-it-yourself" automobile owners to convey refrigerant into the low pressure side of an automotive air conditioning system in order to recharge the system. For do-it-yourself recharging of automotive air conditioners, a pressure tight assembly is needed which couples and seals with the refrigerant container, conveys the refrigerant, and couples with a recharging nipple fitting provided in the low side piping of a typical automotive air conditioning system.

One example of a prior art fluid conveying device is disclosed in U.S. Pat. No. 3,976,110. The '110 patent discloses a device having a connector which threadably couples with a correspondingly threaded stem on a special aerosol container, a delivery hose, and a conventional swivel fitting which correspondingly couples with a fitting on the low side piping of an air conditioning system. The device as disclosed in the '110 patent requires that the upstanding stem on an aerosol container be threaded and adapted to receive the corresponding connector of the device.

Conventional aerosol containers, however, do not have a threaded upstanding stem but rather have a nonthreaded, axially shiftable, tubular stem which is desirable in order to minimize container manufacturing cost. Thus, the prior art discloses a need for an actuator and hose assembly which can couple with a conventional, upstanding, axially shiftable, tubular stem on an aerosol container.

SUMMARY OF THE INVENTION

The problems outlined above are solved by the actuator and hose assembly in accordance with the present invention. That is to say, the actuator and hose assembly hereof couples and seals with a conventional aerosol container having an upstanding, nonthreaded, axially shiftable stem and allows resealing of the can after the needed portion of the pressurized fluid contents therein have been discharged.

Broadly speaking, the actuator and hose assembly hereof includes a fluid conveying hose having a fitting at one end thereof for fluidically coupling one end of the hose with a receiver, and an actuator sub-assembly coupled with the other end of the hose. The sub-assembly includes an actuator collar configured for friction coupling with the seam ring on the aerosol container, a selectively manually shiftable, upwardly biased actuator element coupled coaxially within the collar and presenting a stem-engaging shoulder configured to abuttingly engage and axially downwardly shift the stem, and an enclosed fluid departure channel defined in the element directing the fluid escaping through the stem into the other end of the hose with the shoulder of the element providing a fluid seal between the stem when abuttingly engaging the end of the stem.

Desirably, the actuator element includes a manually engagable depressor disk and the actuator collar includes an openable protective cover to prevent inadvertent manual shifting of the element. Additionally, the sub-assembly is preferably composed of synthetic resin material and the fitting includes structure for coupling with a conventional recharging nipple on automotive air conditioning system.

BRIEF DESCRIPTION OF THE DRAWINGS

FIG. 1 is a perspective view of the actuator and hose assembly coupled to an aerosol container;

FIG. 2 is a partial plan view of the actuator sub-assembly with the protective cover closed;

FIG. 3 is a view similar to FIG. 2 but with the protective cover open;

FIG. 4 is a sectional view of the actuator sub-assembly along line 4—4 of FIG. 2; and FIG. 5 is a sectional view of the end-of-hose fitting of FIG. 1.

DESCRIPTION OF THE PREFERRED EMBODIMENT

Referring now to the drawings, actuator and hose assembly 10 broadly includes flexible fluid conveying hose 12 having conventional swivel fitting 14 attached to one end thereof, and actuator subassembly 16.

Hose 12 is preferably composed of flexible, clear, synthetic resin material which is chemically inert relative to the fluid to be conveyed therein.

Fitting 14 is conventional in nature and selected as matter of design choice to provide convenient fluidic coupling with the receiver of the fluid to be delivered by actuator hose assembly 10. Preferably, fitting 14 is adapted to couple with the recharging nipple on automotive air conditioning system and includes a recharging nipple check valve depressing stem, an integral ball check valve, and a rubber gasket. These components of fitting 14 are entirely conventional and are not shown in the drawing figure.

Actuator sub-assembly 16 is preferably composed of synthetic resin material chemically inert with respect to the fluid to be conveyed. Sub-assembly 16 integrally includes actuator collar 18, actuator element 20, fluid departure channel 22 defined in element 20, and hose connector 24.

Tubular actuator collar 18 integrally includes a lower tubular coupling section 26, an upper, tubular, lesser diameter section 28 integrally attached to lower coupling section 26 as shown in FIGS. 1 and 4, eight cylindrical friction coupling ribs 30 integrally defined about the interior of lower coupling section 26, and openable hinged protective cover 32.

Actuator element 20 integrally includes biasing tube 34 which extends radially through upper collar section 28, tubular actuator unit 36 coupled with the interior end of biasing tube 34 and coaxially positioned within collar 18, and manual depressor disk 38 coupled with the upper surfaces of biasing tube 34 and actuator unit 36.

Biasing tube 34 supports actuator unit 36 and disk 38 so that actuator element 20 can be flexed downwardly and so that actuator element 20 is also biased upwardly.

Actuator unit 36 presents a frustoconically shaped, stem-receiving port 40 defined in the lower end thereof and further presents stem-engaging shoulder 42 defined adjacent the upper portion of port 40.

Circular depressor disk 38 includes a series of traction ridges 39 defined and aesthetically configured on the upper surface thereof.

Fluid departure channel 22 presents two sub-channels 22a, 22b centrally defined in biasing tube 34 and actuator unit 36 respectively. Subchannels 22a, 22b are disposed at right angles to one another with respective ends thereof in fluidic communication as shown in FIG. 4. The lower end of sub-channel 22b communicates with port 40 so that fluid entering port 40 is directed through channel 22 into hose 12.

Tubular hose connector 24 couples the end of hose 12 remote from fitting 14 to sub-assembly 16. The exposed exterior end of biasing tube 34 is configured to fit within the exposed end of hose 12 with connector 24 tightly and concentrically surrounding the hose end to securely couple it to tube 34.

The preferred actuator and hose assembly 10 is configured to couple with a conventional aerosol container 44 having pressurized fluid refrigerant therein. Aerosol container 44 includes upwardly biased and extending, axially shiftable, tubular stem 46 presenting an exposed end 48. Stem 46 is biased upwardly by the pressure of the fluid within container 44 and may additionally be biased upwardly in some containers by means of a spring (not shown).

Stem 46 is operably coupled with an internal valve of container 44 (not shown) so that when stem 46 is shifted axially downwardly, fluid within container 44 is released therethrough, and when downward pressure is released, stem 46 returns to its upwardly biased position and prevents further fluid escape.

Container 44 also conventionally includes a circular, upstanding, container valve seam ring 50.

In the use of actuator and hose assembly 10, fitting 14 is first coupled with the recharging nipple of an automotive air conditioner in the preferred use. Actuator sub-assembly 16 is then coupled to container 44 by placing collar 18 about seam ring 50. Coupling ribs 30 fit snugly about the exterior circumference of ring 50 and provide a friction or interference fit thereby coupling actuator sub-assembly 16 to container 44.

When sub-assembly 16 is placed on container 44, port 40 also aligns with stem 46; the frustoconical configuration of port 40 helps guide and center stem 46 therein so that stem end 48 comes into abutting engagement with shoulder 42.

Protective cover 32 is next opened to expose depressor disk 38. The user then depresses disk 38 with a finger or thumb which action translates into axially downward movement of element 20 and stem 46. Traction ridges 39 help prevent the user's finger or thumb from slipping while depressing element 20.

When stem 46 moves downwardly, the pressurized fluid within container 44 is free to move outwardly through stem 46, port 40, departure channel 22, hose 12, and fitting 14 into the low pressure side of the automotive air conditioning system through the recharging nipple. When element 20 shifts downwardly, shoulder 42 comes into abutting engagement with stem end 48 and thereby provides a seal between stem 46 and element 20 to prevent exterior fluid leakage.

Actuator element 20 is biased upwardly by biasing tube 34 so that when manual pressure is released from disk 38, element 20 moves upwardly which in turn allows stem 46 to move upwardly under its own biasing force. This in turn shuts off the fluid flow from container 44.

The use of actuator and hose assembly 10 allows the exact amount of refrigerant needed to be introduced into the air conditioning system, and furthermore allows stem 46 to shut off the fluid flow from container 44 so that the fluid remaining therein can be saved for future use. A particular advantage of the preferred actuator and hose assembly 10 is that it allows refrigerant to be dispensed from a conventional and inexpensive aerosol container without the need for special threaded fittings or the like.

The present invention contemplates many variations in the specific embodiment herein described. For example, hose 12 and actuator subassembly 16 can advantageously be composed of other materials such as flexible metal tubing and brass respectively for increased durability as desired. Additionally, actuator element 20 is biased upwardly by the nature of biasing portion 32 but other biasing means such as leaf springs or coiled springs could be incorporated therein for the same purpose according to techniques known in the art.

Having thus described the preferred embodiment of the present invention, what is claimed as new and desired to be secured by Letters Patent is:

1. A method of adding refrigerant to an air conditioning system having a refrigerant inlet fitting, said method comprising the steps of:

providing an aerosol container having an outwardly extending, tubular stem presenting an exposed end, said stem being axially shiftable between closed and fluid discharge positions and biased toward said closed position;

filling said container with refrigerant under pressure suitable for use by the system;

providing refrigerant transfer means for transferring refrigerant from said container the system, said transfer means including a refrigerant hose presenting first and second opposed ends, fitting connection means fluidically coupled with said first hose end for fluidically coupling said hsoe with the refrigerant inlet fitting, said connection means including check valve means for preventing refrigerant escape from the system when said fitting connection means is connected with the inlet fitting, and actuator means fluidically coupled with said hose end for fluidically coupling said hose with said stem end and for selective manual shifting of said stem between said closed and discharge positions;

fluidically coupling said actuator means with said stem end;

fluidically connecting said connection means with the refrigerant inlet fitting; and selectively manually shifting said stem to said discharge position for transferring refrigerant from said container through said transfer means into the air conditioning system.

2. The method is set forth in claim 1, the container including an upstanding container ring adjacent the stem, said actuator means including an actuator collar coupled with said second hose end and including means for releasably coupling with the container ring.

3. The method is set forth in claim 2, said actuator means further including an actuator element coupled with said actuator collar and including a manually accessible and shiftable actuator unit including structure defining a fluid port and including means for sealing engagement with the stem end for extablishing fluid communication between the stem and said fluid port, and coupling and biasing means defining a non-valved fluid channel fluidically coupling said fluid port and said second hose end through said collar, for shiftably coupling said actuator unit with said collar for allowing said shifting of said unit between a depressed position in which the stem is shifted downwardly by said unit and a released position in which the stem is allowed to shift upwardly, and for biasing said actuator unit toward said released position.

4. The method is set forth in claim 3, said actuator unit including a manually engageable depressor disc coupled with said unit for manual shifting of said unit to said depressed position.

5. The method is set forth in claim 3, said coupling and biasing means being formed of flexible, synthetic resin material for allowing flexible shifting of said coupling and biasing means.

6. The method is set forth in claim 2, said collar presenting a tubular configuration and presenting an interior surface, said collar including a plurality of upstanding, inwardly extending, connecting ribs coupled with said interior surface for frictional engagement with the container ring in order to couple said collar thereto.

7. The method is set forth in claim 2, said collar including an openable protective cover hingedly coupled therewith for selectively preventing manual contact with said actuator unit when said collar is coupled with the container ring.

8. The method is set forth in claim 2, said collar and said actuator element being integrally formed to present a unitary construction.

9. The method is set forth in claim 1, the refrigerant inlet fitting including a check valve having a shiftable, upstanding, check stem, said fitting connection means including depressing means for depressing the check stem when said fitting connection means is coupled with the inlet fitting in order to allow refrigerant flow through the fitting into the system.

10. The method is set forth in claim 1, said air conditioning system including an automotive air conditioning system, said filling step including the step of filling said container with refrigerant under pressure suitable for use in an automotive air conditioning system.

* * * * *

UNITED STATES PATENT AND TRADEMARK OFFICE
CERTIFICATE OF CORRECTION

PATENT NO. : 4,895,190
DATED : 1/23/90
INVENTOR(S) : DONALD P. GILLEN

It is certified that error appears in the above—identified patent and that said Letters Patent is hereby corrected as shown below:

ON TITLE PAGE: delete "[73] Assignee: Airosol Company, Inc., Neodesha, Kans."

Signed and Sealed this

Twelfth Day of May, 1992

Attest:

DOUGLAS B. COMER

Attesting Officer

Acting Commissioner of Patents and Trademarks